(12) United States Patent
Peng et al.

(10) Patent No.: US 11,662,625 B2
(45) Date of Patent: May 30, 2023

(54) TRANSPARENT DISPLAY DEVICE, METHOD OF MANUFACTURING THE SAME AND BACKLIGHT MODULE

(71) Applicant: BOE TECHNOLOGY GROUP CO., LTD., Beijing (CN)

(72) Inventors: Yidan Peng, Beijing (CN); Long Wang, Beijing (CN); Nanfang Jia, Beijing (CN); Zhiliang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/304,518

(22) Filed: Jun. 22, 2021

(65) Prior Publication Data
US 2022/0146880 A1    May 12, 2022

(30) Foreign Application Priority Data
Nov. 11, 2020 (CN) .......................... 202011257500.5

(51) Int. Cl.
*G02F 1/13357* (2006.01)
*G02F 1/1335* (2006.01)

(52) U.S. Cl.
CPC .. *G02F 1/133606* (2013.01); *G02F 1/133613* (2021.01)

(58) Field of Classification Search
CPC .................................. G02F 1/133611
See application file for complete search history.

(56) References Cited

U.S. PATENT DOCUMENTS

| | | | |
|---|---|---|---|
| 2012/0008067 A1* | 1/2012 | Mun | G02B 6/0038 362/606 |
| 2014/0104878 A1* | 4/2014 | Chen | G02B 6/0053 362/611 |

FOREIGN PATENT DOCUMENTS

CN    110346968 A  * 10/2019  .......... G02B 6/0033

* cited by examiner

*Primary Examiner* — Anabel Ton
(74) *Attorney, Agent, or Firm* — Kinney & Lange, P.A.

(57) ABSTRACT

A transparent display device and a backlight module are provided. The transparent display device includes: a scattered display panel including a display side; a first base substrate on a side of the scattered display panel facing away from the display side; a light source on a side of the first base substrate; and a dot-array structure between the scattered display panel and the first base substrate. The first base substrate includes a light incident surface and a light emitting surface. The dot-array structure includes a plurality of protrusions, and orthographic projections of the plurality of protrusions on the light emitting surface are distributed in an array. An orthographic projection of each protrusion on a first plane is in an inverted trapezoidal shape in a direction from the first base substrate to the scattered display panel.

18 Claims, 11 Drawing Sheets

TRANSPARENT DISPLAY DEVICE, METHOD OF MANUFACTURING THE SAME AND BACKLIGHT MODULE

CROSS-REFERENCE TO RELATED APPLICATION

This application claims the benefit of Chinese Patent Application No. 202011257500.5 filed on Nov. 11, 2020 in the State Intellectual Property Office of China, the whole disclosure of which is incorporated herein by reference.

TECHNICAL FIELD

The present disclosure relates to the field of display technologies, and in particular, to a transparent display device, a backlight module and a method of manufacturing the transparent display device.

BACKGROUND

With the development of technology, transparent display devices, such as transparent shop windows, transparent traffic signs, transparent watches, transparent car displays, transparent displays, home displays and wearable displays, have gradually entered people's lives with broad application prospects. A transparent display device is a display device which allows the user to watch a display screen of the transparent display device and a scene or objects behind the transparent display device at the same time. Therefore, the transparent display device may realize integration and interaction between the display screen of the transparent display device and the scene or objects behind the transparent display device, thereby bringing a brand new, rich, expressive visual experience to the user.

The information disclosed above is only used for the understanding of the background of the technical concept of the present disclosure, therefore, the above information does not constitute the information of the prior art.

SUMMARY

In one aspect, a transparent display device is provided, wherein the transparent display device includes: a scattered display panel, wherein the scattered display panel includes a display side; a first base substrate, wherein the first base substrate is disposed on a side of the scattered display panel facing away from the display side; a light source, wherein the light source is disposed on a side of the first base substrate; and a dot-array structure, wherein the dot-array structure is disposed between the scattered display panel and the first base substrate, wherein the first base substrate has a light incident surface and a light emitting surface, the light incident surface and the light source are disposed opposite to each other, and the light emitting surface is located on a side of the first base substrate close to the dot-array structure; wherein the dot-array structure includes a plurality of protrusions, orthographic projections of the plurality of protrusions on the light emitting surface are distributed in an array; and an orthographic projection of each protrusion on a first plane is in an inverted trapezoidal shape in a direction from the first base substrate to the scattered display panel, wherein the first plane is perpendicular to both the light emitting surface and the light incident surface.

According to some exemplary embodiments, a distribution density of the orthographic projections of the plurality of protrusions on the light emitting surface gradually increases in a direction away from the light source.

According to some exemplary embodiments, each protrusion is provided with a first side wall away from the light source, an inclination angle is located between the first side wall and the light emitting surface, and the first inclination angle is between 60° and 90°.

According to some exemplary embodiments, the transparent display device further includes a plurality of low-refractive-index portions, the plurality of low-refractive-index portions are disposed in gaps formed between any two adjacent protrusions, respectively, and a refractive index of a material of the low-refractive-index portion is smaller than a refractive index of a material of the protrusion.

According to some exemplary embodiments, the scattered display panel includes: an array substrate, the array substrate includes a first substrate; a counter substrate aligned with the array substrate, the counter substrate includes a second substrate; and a liquid crystal layer between the array substrate and the counter substrate, wherein the dot-array structure is disposed between the first substrate and the first base substrate, a surface of each protrusion facing the display side is in contact with the first substrate, and a surface of each protrusion facing away from the display side is in contact with the first base substrate.

According to some exemplary embodiments, the first base substrate, the first substrate and the second substrate are all glass substrates.

According to some exemplary embodiments, the scattered display panel includes: an array substrate, the array substrate includes a first substrate; a counter substrate aligned with the array substrate, the counter substrate includes a second substrate; and a liquid crystal layer between the array substrate and the counter substrate, wherein the transparent display device further includes a second base substrate between the first base substrate and the first substrate, wherein the dot-array structure is disposed between the first base substrate and the second base substrate, a surface of each protrusion facing the display side is in contact with the second base substrate, and a surface of each protrusion facing away from the display side is in contact with the first base substrate.

According to some exemplary embodiments, the first base substrate, the second base substrate, the first substrate and the second substrate are all glass substrates.

According to some exemplary embodiments, the refractive index of the material of the protrusion is greater than a refractive index of glass.

According to some exemplary embodiments, the transparent display device further includes an optical adhesive layer between the second base substrate and the first substrate, and a refractive index of a material of the optical adhesive layer is substantially equal to the refractive index of the material of the second base substrate.

According to some exemplary embodiments, the refractive index of the material of the protrusion is between 1.7 and 4.

According to some exemplary embodiments, the orthographic projections of the plurality of protrusions on the light emitting surface are distributed in an array in a first direction and in a second direction, so as to form a plurality of distribution areas, the plurality of distribution areas at least include a first distribution area, a second distribution area and a third distribution area, and the first distribution area, the second distribution area and the third distribution area arranged in the direction away from the light source in sequence; and a pitch between two adjacent protrusions in the first distribution area in the first direction is greater than a pitch between two adjacent protrusions in the second distribution area in the first direction, and the pitch between two adjacent protrusions in the second distribution area in the first direction is greater than a pitch between two adjacent protrusions in the third distribution area in the first direction; and/or a pitch between two adjacent protrusions in the first distribution area in the second direction is greater than a pitch between two adjacent protrusions in the second distribution area in the second direction, and the pitch between two adjacent protrusions in the second distribution area in the second direction is greater than a pitch between two adjacent protrusions in the third distribution area in the second direction.

According to some exemplary embodiments, the low-refractive-index portion includes air.

According to some exemplary embodiments, each protrusion has a first surface close to the first base substrate, and a size of an orthographic projection of the first surface on the light emitting surface in the first direction is between 8 and 12 microns; and/or a size of the orthographic projection of the first surface on the light emitting surface in the second direction is between 8 and 12 microns; and/or a size of each protrusion in a direction perpendicular to the light emitting surface is at least 0.5 micron.

According to some exemplary embodiments, a size of the light source in a direction perpendicular to the light emitting surface is greater than a size of the first base substrate in the direction perpendicular to the light emitting surface.

In another aspect, a backlight module is provided, wherein the backlight includes: a first base substrate; a second base substrate opposite to the first base substrate; a light source on a side of the first base substrate; and a dot-array structure between the first base substrate and the second base substrate, wherein the first base substrate has a light incident surface and a light emitting surface opposite to each other, and the light emitting surface is located on a side of the first base substrate close to the dot-array structure; wherein the dot-array structure includes a plurality of protrusions, and orthographic projections of the plurality of protrusions on the light emitting surface are distributed in an array; wherein the dot-array structure is disposed between the first base substrate and the second base substrate, a surface of each protrusion facing the first base substrate is in contact with the first base substrate, and a surface of each protrusion facing the second base substrate is in contact with the second base substrate; and wherein an orthographic projection of each protrusion on a first plane is in an inverted trapezoidal shape in a direction from the first base substrate to the scattered display panel, and the first plane is perpendicular to both the light emitting surface and the light incident surface.

In yet another aspect, a method of manufacturing a transparent display device is provided, wherein the method includes: aligning and assembling an array substrate with a counter substrate to form a scattered display panel, wherein the array substrate includes a first substrate, and the scattered display panel includes the array substrate, the counter substrate and a liquid crystal layer between the array substrate and the counter substrate; depositing a dot-array structure material film layer on a surface of the first substrate away from the liquid crystal layer; performing a patterning process on the dot-array structure material film layer to form a dot-array structure; and aligning and assembling a first base substrate with the scattered display panel provided with the dot-array structure, wherein the first base substrate includes a light emitting surface facing the scattered display panel and a light incident surface perpendicular to the light emitting surface, wherein the dot-array structure includes a plurality of protrusions, and orthographic projections of the plurality of protrusions on the light emitting surface are distributed in an array, and an orthographic projection of each protrusion on a first plane is in an inverted trapezoidal shape in a direction from the first base substrate to the scattered display panel, and the first plane is perpendicular to both the light emitting surface and the light incident surface.

In yet another aspect, a method of manufacturing a transparent display device is provided, wherein the method includes: providing a first base substrate and a second base substrate; depositing a dot-array structure material film layer on the second base substrate; performing a patterning process on the dot-array structure material film layer to form a dot-array structure; aligning and assembling the first base substrate with the second base substrate provided with the dot-array structure to form a backlight module, wherein in the backlight module, the dot-array structure is located between the first base substrate and the second base substrate; aligning and assembling an array substrate with a counter substrate to form a scattered display panel; and assembling the backlight module and the scattered display panel, wherein the first base substrate has a light emitting surface facing the scattered display panel and a light incident surface perpendicularly connected to the light emitting surface, wherein the dot-array structure includes a plurality of protrusions, and orthographic projections of the plurality of protrusions on the light emitting surface are distributed in an array; and an orthographic projection of each protrusion on a first plane is in an inverted trapezoidal shape in a direction from the first base substrate to the scattered display panel, wherein the first plane is perpendicular to both the light emitting surface and the light incident surface.

BRIEF DESCRIPTION OF THE DRAWINGS

Through the description to the present disclosure with reference to the drawings below, other purposes and advantages of the present disclosure will become apparent, which may facilitate a comprehensive understanding of the present disclosure, wherein.

Figure 1:
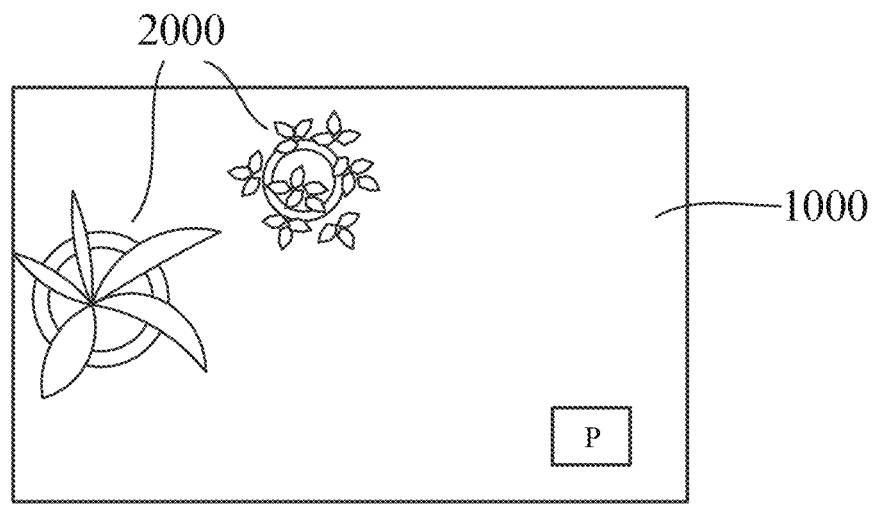
FIG. 1 is a diagram schematically shows a transparent display device according to embodiments of the present disclosure.

It should be noted that, for clarity, in the drawings used to describe the embodiments of the present disclosure, sizes of layers, structures and regions may be enlarged or reduced, that is, these drawings are not drawn to actual scale.

DETAILED DESCRIPTION OF EMBODIMENTS

In the following, with reference to the drawings, the technical solution of the present disclosure will be further described more specifically through the embodiments. In the specification, the same or like reference numerals indicate the same or like components. The description below to the embodiments of the present disclosure with reference to the drawings is intended to explain the general inventive concept of the present disclosure, and should not be construed as limiting the present disclosure.

In addition, in the detailed description below, for ease of explanation, some specific details are illustrated to provide a comprehensive understanding of the embodiments of the present disclosure. However, it is obvious that one or more embodiments may also be implemented without these specific details.

It should be noted that, "above", "formed on" and "disposed on" herein may indicate that one layer is formed or provided on another layer directly, or one layer is formed or provided on another layer indirectly, that is, there may be other layers between the two layers.

It should be noted that, although "first", "second" and other terms may be used here to describe various components, members, elements, regions, layer and/or portions, these components, members, elements, regions, layer and/or portions should not be limited by these terms. Instead, these terms are used to distinguish one component, member, element, region, layer and/or portion from another. Therefore, for example, the first component, the first member, the first element, the first region, the first layer and/or the first portion may be referred to as the second component, the second member, the second element, the second region, the second layer and/or the second portion, which does not depart from the teaching of the present disclosure.

Here, unless otherwise particularly specified, the expression "display side" refers to a side of a display device or display panel in a display light emitting direction, that is, a side where user's eyes are located, and the expression "back side" refers to a side of a display device or display panel facing away from the display side, that is, a side in a direction opposite to the display light emitting direction.

Here, an XYZ coordinate system is established for ease of describing a relative positional relationship between various layers, components, elements and members. It should be noted that, the XYZ coordinate system used here and the corresponding X, Y, Z directions are only intended for the ease of describing various embodiments, and are not intended to limit the various embodiments of the present disclosure.

Here, unless otherwise specified, in the backlight module and the display device according to the embodiments of the present disclosure, the Z direction refers to a direction perpendicular to a light-emitting surface of the backlight module or a display surface of the display panel, alternatively, the Z direction refers to a stacked direction of various substrates of the display device.

It should be noted that, "thickness" here indicates a size of each substrate, film layer, element, component or member along the Z direction.

The embodiments of the present disclosure provide a transparent display device, a backlight module and a method of manufacturing the transparent display device. The transparent display device includes: a scattered display panel, the scattered display panel includes a display side; a first base substrate, the first base substrate is provided on a side of the scattered display panel away from the display side; a light source, the light source is provided on one side of the first base substrate; and a dot-array structure, the dot-array structure is provided between the scattered display panel and the first base substrate, wherein the first base substrate is provided with a light incident surface and a light emitting surface, the light incident surface is disposed opposite to the light source, and the light emitting surface is located on a side of the first base substrate close to the dot-array structure; the dot-array structure includes a plurality of protrusions, and orthographic projections of the plurality of protrusions on the light emitting surface are distributed in an array; and an orthographic projection of each protrusion on the first surface is in an inverted trapezoidal shape in a direction from the first base substrate to the scattered display panel, wherein the first surface is perpendicular to both the light emitting surface and the light incident surface. In the embodiments of the present disclosure, with the inverted-trapezoidal design of the protrusion, transparent display may be realized, and the structure of the transparent display device is simple, which is beneficial for thinning of the transparent display device, and is beneficial for simplifying the process of manufacturing the transparent display device.

FIG. 1 is a diagram schematically shows a transparent display device according to the embodiments of the present disclosure. Referring to FIG. 1, a display device 1000 according to the embodiments of the present disclosure may have a transparent property and allow an object or a background (such as the plant 2000 shown in FIG. 1) behind the display device 1000 to be visible. The display device 1000 is called a transparent display. A transparent display may be used as, for example, a display case, glass of an automobile, and a window of a building for transmitting detailed information and functions of products to be used, so as to provide various information. The transparent display may be applied to various objects and may be combined with content that interacts with objects. For example, the transparent display may be combined with augmented reality technology.

For example, the display device 1000 may be any product or component with a display function, for example, a smart phone, a wearable smart watch, smart glasses, a tablet computer, a television, a display, a laptop computer, a digital photo frame, a navigator, a car monitor, an e-book, a display case, a display window and a display of an appliance, etc.

For example, the display device 1000 may include a plurality of pixels P, and one pixel P is schematically shown in FIG. 1.

For example, the transparent display device may include: (1) a transparent display device based on a conventional liquid crystal display panel, (2) a transparent display device based on a light-emitting diode (LED) display panel, (3) a transparent display device based on an organic light-emitting diode (OLED), and (4) a transparent display device based on a scattered display panel. During the research process, since the conventional liquid crystal display panel includes a polarizer and other film layers, a light transmittance of the transparent display device based on the conventional liquid crystal display panel is less than 10%, so that the transparent display device based on the conventional liquid crystal display panel has low brightness and low light utilization. Since a size of the light-emitting diode is large, the transparent display device based on the light-emitting diode display panel has large pixels, which is suitable for a super-large transparent display device. In addition, a cost of the transparent display devices based on an organic light-emitting diode (OLED) display panel is high, and a lifetime is difficult to guarantee. However, the scattered transparent display technology uses a field sequential light source with a fast-response liquid crystal (such as polymer dispersed liquid crystal or polymer stabilized liquid crystal) without polarizers and color filters, therefore, the light transmittance of the transparent display device based on the scattered display panel is relatively high (above 80%), and a manufacturing process thereof is similar to that of the conventional liquid crystal display panel, so that the cost is low and its reliability and service life are relatively high.

Figure 2:
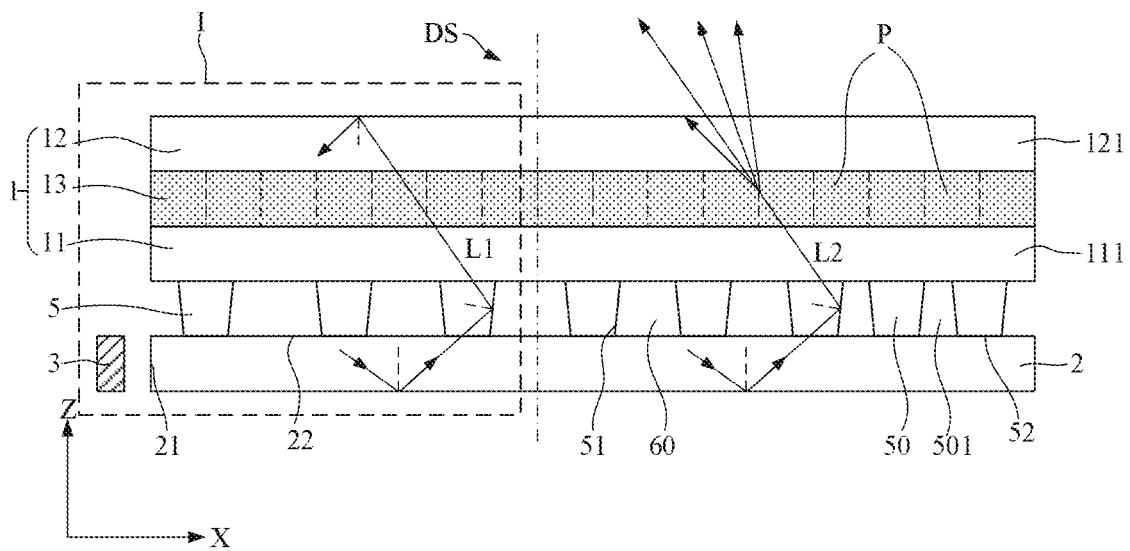
FIG. 2 is a schematic cross-sectional view of the transparent display device according to the embodiments of the present disclosure.

The transparent display device according to the embodiments of the present disclosure may be a transparent display device based on a scattered display panel. FIG. 2 is a schematic cross-sectional view of a transparent display device according to some exemplary embodiments of the present disclosure. As shown in FIG. 2, the transparent display device adopts a side-type light source. The transparent display device may include: a scattered display panel 1, wherein the scattered display panel 1 includes a plurality of pixels P, and the scattered display panel includes a display side DS (a side in the display light-emitting direction, that is, a side where the human eye is focused during display, and the side is shown as an upper side in FIG. 2); a first base substrate 2, wherein the first base substrate 2 is disposed on a side of the scattered display panel 1 away from the display side DS; a light source 3, wherein the light source 3 is disposed on one side of the first base substrate 2; and a dot-array structure 5, wherein the dot-array structure 5 is disposed between the scattered display panel 1 and the first base substrate 2.

As shown in FIG. 2, the light source 3 is arranged on one side of the first base substrate 2, in this way, one side surface of the first base substrate 2 is opposite to the light source 3. The first base substrate 2 has a light incident surface 21 and a light emitting surface 22. The light incident surface 21 may be disposed opposite to the light source 3, that is, the light incident surface 21 is a side surface of the first base substrate 2 opposite to the light source 3, which is shown as a left side surface in FIG. 2. Light emitted from the light source 3 and incident through the light incident surface 21 may be emitted from at least one light emitting surface 22 of the first base substrate 2. For example, in the embodiment of FIG. 2, the light emitting surface 22 may be located on a side of the first base substrate 2 close to the dot-array structure 5, that is, the light emitting surface 22 is an upper surface of the first base substrate 2.

Figure 3:
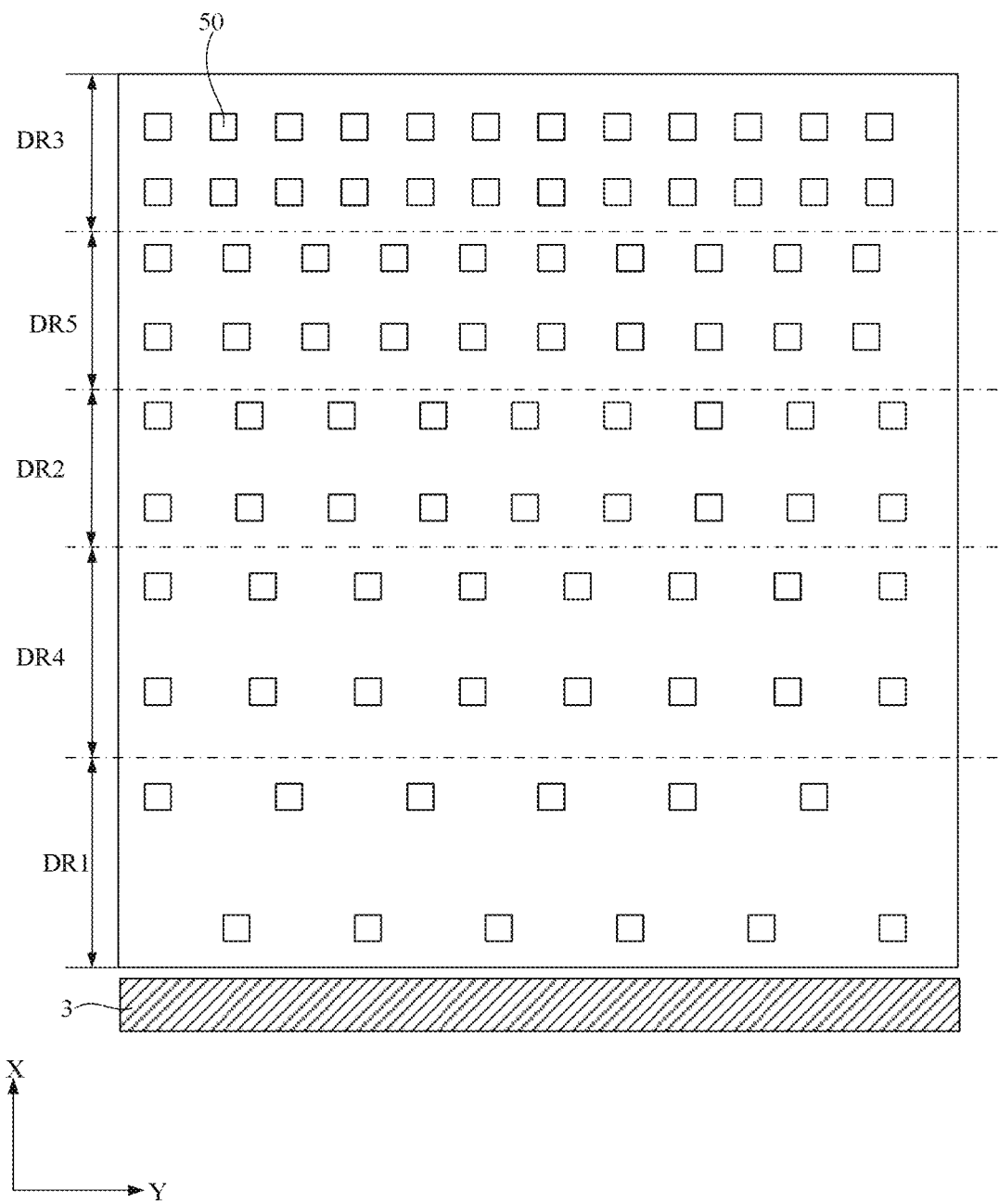
FIG. 3 is a schematic plan view of a dot-array structure included in the transparent display device according to the embodiments of the present disclosure.

FIG. 3 is a schematic plan view of a dot-array structure included in a transparent display device according to the embodiments of the present disclosure. With reference to FIGS. 2 and 3 in combination, the dot-array structure 5 may include a plurality of protrusions 50, and orthographic projections of the plurality of protrusions 50 on the light emitting surface 22 are distributed in an array. For example, the orthographic projections of the plurality of protrusions 50 on the light emitting surface 22 are distributed in an array in a first direction X and in a second direction Y.

In this context, unless otherwise specified, the expression "distributed in an array" means that orthographic projections of structures, components, elements or features (such as protrusions) on at least one plane are distributed at intervals in two directions intersect with each other (for example, perpendicular to each other) in the plane, so as to form a distribution form of a plurality of rows and a plurality of columns.

In the embodiments of the present disclosure, an orthographic projection of each protrusion 50 on a first plane is in an inverted trapezoid shape in a direction from the first base substrate 2 to the scattered display panel 1. The first plane is perpendicular to both the light emitting surface 22 and the light incident surface 21, that is, the first plane is an XZ plane.

It should be noted that the direction from the first base substrate 2 to the scattered display panel 1 is the Z direction shown in FIG. 2, that is, the direction from a back side to the display side.

Figure 4:
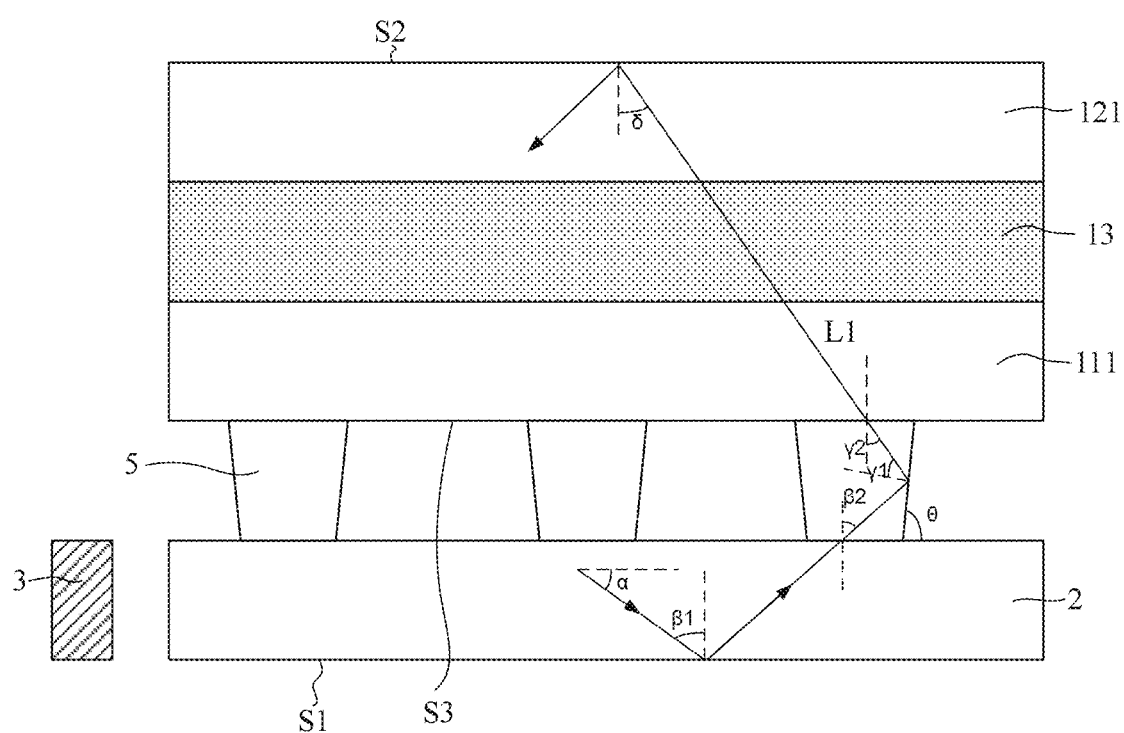
FIG. 4 is a partial enlarged view of part I in FIG. 2.

FIG. 4 is a partial enlarged view of part I in FIG. 2. Referring to FIGS. 2 to 4 in combination, each protrusion 50 includes a first side wall 51 away from the light source 3, and there is a first inclination angle θ between the first side wall 51 and the light emitting surface 22. Since the protrusion 50 has an inverted trapezoidal shape, the first inclination angle θ is an acute angle. In this way, light emitted from the light source 3 and incident on the first side wall 51 may be totally reflected on the first side wall 51. Light rays L1 and L2 reflected by the first side wall 51 directly enter the scattered display panel 1. When the pixel P is in a transparent state (such as the pixel on the left in FIG. 2), the light ray L1 reflected by the first side wall 51 directly passes through the pixel P and is reflected back on an upper surface of the liquid crystal cell; When the pixel P is in a scattered state (for example, the pixel on the right in FIG. 2), the light ray L2 reflected by the first side wall 51 is scattered in the liquid crystal layer of the pixel P, and the scattered light may be emitted from the scattered display panel 1, thereby an image is displayed on the scattered display panel 1. At the same time, the light emitted or reflected by the scenes and objects on the back side of the display device may propagate in the first base substrate 2, the dot-array structure 5 and the scattered display panel 1, and is emitted from the scattered display panel 1, thereby achieving a transparent display on the display side of the scattered display panel. In this way, through the inverted trapezoidal design of the protrusion, the transparent display may be achieved, and the structure of the transparent display device is relatively simple, which is beneficial to the thinning of the transparent display device, and is beneficial to simplify the process of manufacturing the transparent display device.

Referring to FIG. 3, a distribution density of the orthographic projections of the plurality of protrusions 50 on the light emitting surface 22 gradually increases in a direction away from the light source 3. That is to say, the distribution of the orthographic projections of the plurality of protrusions 50 on the light emitting surface 22 gradually changes from sparse distribution to dense distribution in the direction away from the light source 3. On a side close to the light source 3, the plurality of protrusions 50 are distributed sparsely; on a side far from the light source 3, the plurality of protrusions 50 are distributed more densely. Through an uneven distribution of the plurality of protrusions, the light passing through the dot-array structure may uniformly enter the liquid crystal layer, thereby uniformly emitting from the display panel 1, that is, the display uniformity of the display device may be improved.

In some embodiments, the transparent display device may further include a plurality of low-refractive-index portions 60, and the plurality of low-refractive-index portions 60 are respectively disposed in gaps 501 formed between any two adjacent protrusions 50, respectively, and a refractive index of a material of the low-refractive-index portion 60 is smaller than a refractive index of a material of the protrusion 50.

For example, the material of the protrusion 50 may be selected from transparent materials such as indium tin oxide (ITO) and silicon nitride, etc., and the refractive index of the protrusion 50 may be between 1.7 and 4.

For example, the low-refractive-index portion 60 may include air, that is, the low-refractive-index portion 60 is an air gap formed in the gap 501 formed between any two adjacent protrusions 50.

In the embodiment shown in FIG. 2, the scattered display panel 1 may include: an array substrate 11, a counter substrate 12, and a liquid crystal layer 13 between the array substrate 11 and the counter substrate 12. The counter substrate 12 and the array substrate 11 are aligned and assembled with each other. The array substrate 11 includes a first substrate 111 and a plurality of pixel electrodes on the first substrate 111. The counter substrate 12 includes a second substrate 121. The liquid crystal layer 13 includes polymer stabilized liquid crystal or polymer dispersed liquid crystal, and each pixel electrode may drive the polymer stabilized liquid crystal or polymer dispersed liquid crystal to switch between a transparent state and a scattered state. The scattered display panel provided by the embodiments of the present disclosure is a scattered liquid crystal display panel. Therefore, the process of manufacturing the scattered liquid crystal display panel is relatively mature and reliable, so that a manufacturing cost of the transparent display device is relatively low, and the stability and service life are relatively high.

As shown in FIG. 2, the dot-array structure 5 is disposed between the first substrate 111 and the first base substrate 2, a surface of each protrusion 50 facing the display side is in contact with the first substrate 111, and a surface of each protrusion 50 facing away from the display side is in contact with the first base substrate 2.

For example, the first base substrate 2, the first substrate 111, and the second substrate 121 may all be glass substrates. That is, their refractive indexes are all about 1.5. That is to say, in the embodiments of the present disclosure, the refractive index of the material of the protrusion 50 is greater than the refractive index of the material (glass) of the first base substrate 2, the first substrate 111, and the second substrate 121. Through such refractive index matching, the transparent display device may perform the transparent display.

Referring to FIG. 2 and FIG. 4 in combination, a formula (1) may be obtained according to the principle of geometric optics below:

$$\alpha + \beta 1 = 90°$$
$$\frac{\sin\beta 1}{\sin\beta 2} = \frac{n2}{n1}$$
$$\theta = 180° - \beta 2 - \gamma 1$$
$$\gamma 1 + \gamma 2 = \theta$$

formula (1)

$$\frac{\sin\gamma 2}{\sin\delta} = \frac{n1}{n2}$$

A formula (2) may be obtained according to the principle of total reflection below:

$$42° \leq \beta 1 \leq 90°$$
$$30° \leq \gamma 1 \leq 90°$$

formula (2)

In formulas (1) and (2), α represents an angle of the light emitted from the light source 3, that is, the angle between the light emitted from the light source 3 and a normal on the light incident surface 21; β1 represents an incident angle of the light emitted from the light source 3 on a lower inner surface of the first base substrate 2; β2 represents an emitting angle of the light emitted from the light emitting surface 22 after refracting; γ1 represents an incident angle of the light incident on the first side wall 51 of the protrusion 50, and it also represents a reflection angle of the light reflected by the first side wall 51; γ2 represents an incident angle of the light reflected by the first side wall 51 and incident on a lower outer surface of the first substrate 111; δ represents an incident angle of the light reflected by the first side wall 51 and incident on an upper inner surface of the second substrate 121, and it also represents a reflection angle of the light reflected by the upper inner surface of the second substrate 121; θ represents a first inclination angle between the first side wall 51 and the light emitting surface 22; n1 represents the refractive index of the material of the first base substrate 2, the first substrate 111, etc.; n2 represents the refractive index of the material of the dot-array structure 5.

Here, for ease of description, the lower inner surface of the first base substrate 2 is called a first interface S1, the upper inner surface of the second substrate 121 is called a second interface S2, and the lower outer surface of 111 of the first substrate 111 is called a third interface S3.

For example, the first base substrate 2, the first substrate 111, and the second substrate 121 may all be glass substrates, that is, their refractive indexes are all about 1.5. The refractive index of the material of the dot-array structure 5 may be about 2. The low-refractive-index portion 60 may be an air gap, that is, its refractive index is about 1.

For example, a light-emitting half-angle range of the light source 3 is 30-65 degrees. For example, the light-emitting half-angle range of the light source 3 is 55-65 degrees, such as 60 degrees.

The first interface S1 is the interface between the first base substrate 2 and outside atmosphere. The light emitted from the light source 3 is incident on the first interface S1. According to the principle of total reflection, most of the light will be totally reflected, as shown by the light ray L1 in FIG. 2 and FIG. 4. The light ray L1 reflected by the first interface S1 is emitted from the light emitting surface 22. On the light emitting surface 22, the light ray L1 enters the protrusion 50 from the first base substrate 2 to be refracted, and thereby being incident on the first side wall 51. The first side wall 51 is an interface between the high refractive index protrusion 50 and the low-refractive-index portion 60. Through the design of the first inclination angle 9, the light ray L1 incident on the first side wall 51 may be totally reflected. The light ray L1 reflected by the first side wall 51 is incident on the third interface S3. On the third interface S3, the light ray L1 enters the first substrate 111 from the protrusion 50 to be refracted, then the light enters the liquid crystal cell. When the liquid crystal cell is in the transparent state, the light ray L1 may directly pass through the liquid crystal cell and be incident on the second interface S2. The second interface S2 is the interface between the second substrate 121 and the outside atmosphere. According to the principle of total reflection, when $42°≤δ≤90°$ is meet, the light ray L1 will be totally reflected on the second interface S2, so that it will be reflected back through total reflection and will not be used to display the image. At the same time, the light emitted or reflected by the scenes and objects on the back side of the display device may propagate in the first base substrate 2, the dot-array structure 5 and the scattered display panel 1, and is emitted from the scattered display panel 1, thereby achieving the transparent display on the display side of the scattered display panel.

By analyzing the above processes, in order to meet $42°≤δ≤90°$, referring to the formulas (1) and (2), the first inclination angle θ needs to meet the following condition:

$$60°≤θ≤90°$$

That is to say, the first inclination angle θ ranges between 60°~90°.

In the exemplary embodiment, the light ray L1 is totally reflected on the first interface S1, the first sidewall 51, and the second interface S2, so that the light ray L1 may be reflected back to the back side, thereby realizing the transparent display of the transparent display device. It should be understood that, the first inclination angle θ is related with factors such as the light source half-angle, thicknesses of the first base substrate, the protrusion, the liquid crystal cell, and the refraction indexes of the first base substrate, the protrusion, the first substrate and the second substrate. In other embodiments, when these factors change, the range of the first inclination angle θ is not limited to the above range. In order to make the light be totally reflected on the first interface S1, the first sidewall 51, and the second interface S2, it is beneficial for the first inclination angle θ to be in the range of 60° to 90°.

Figure 5:
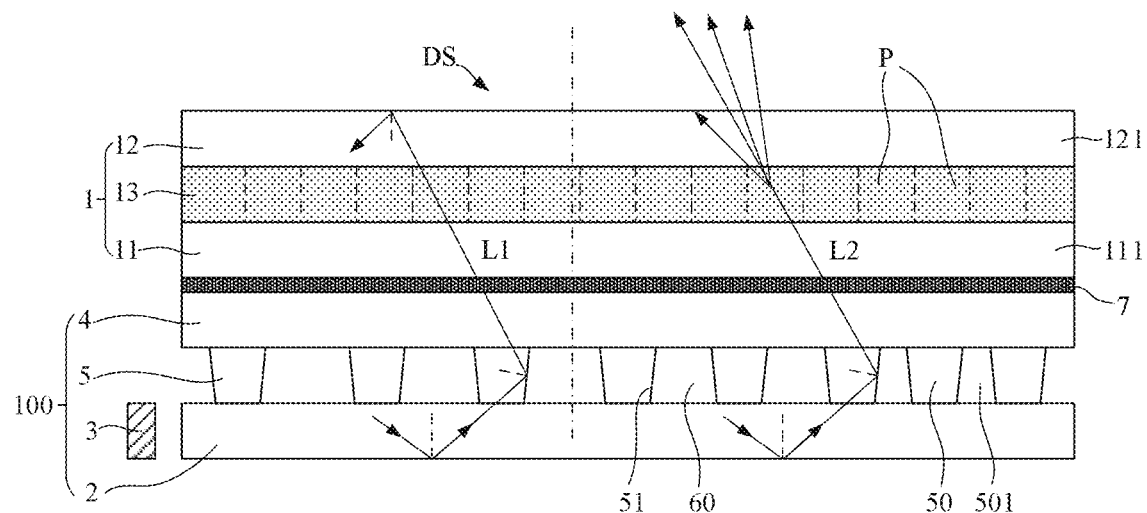
FIG. 5 is a schematic cross-sectional view of a transparent display device according to some other embodiments of the present disclosure.

FIG. 5 is a schematic cross-sectional view of a transparent display device according to some other exemplary embodiments of the present disclosure. The following will mainly describe differences between the embodiments of FIG. 5 and FIG. 2. For the similarities between the two, reference may be made to the above description, which will not be repeated here.

Referring to FIG. 5, the transparent display device may include: a scattered display panel 1, wherein the scattered display panel 1 includes a plurality of pixels P; and a backlight module 100, wherein the backlight module 100 is disposed on a side of the scattered panel 1 facing away from a display side DS.

The scattered display panel 1 may include: an array substrate 11, a counter substrate 12, and a liquid crystal layer 13 between the array substrate 11 and the counter substrate 12. The counter substrate 12 and the array substrate 11 are aligned and assembled with each other. The array substrate 11 includes a first substrate 111 and a plurality of pixel electrodes on the first substrate 111. The counter substrate 12 includes a second substrate 121. The liquid crystal layer 13 includes polymer stabilized liquid crystal or polymer dispersed liquid crystal, and each pixel electrode may drive the polymer stabilized liquid crystal or polymer dispersed liquid crystal to switch between a transparent state and a scattering state.

The backlight module 100 may include: a first base substrate 2; a second base substrate 4 opposite to the first base substrate 2; a light source 3, wherein the light source 3 is disposed on one side of the substrate 2; and a dot-array structure 5, wherein the dot-array structure 5 is disposed between the first base substrate 2 and the second base substrate 4.

In this embodiment, the dot-array structure 5 is disposed between the first base substrate 2 and the second base substrate 4. The dot-array structure 5 includes a plurality of protrusions 50, and orthographic projections of the plurality of protrusions 50 on a light emitting surface 22 are distributed in an array. A surface of each protrusion 50 facing the first base substrate 2 is in contact with the first base substrate 2, and a surface of each protrusion 50 facing the second base substrate 4 is in contact with the second base substrate 4. That is to say, the dot-array structure 5 is located between the first base substrate 2 and the second base substrate 4.

In the embodiments of the present disclosure, the orthographic projection of each protrusion 50 on a first plane is an inverted trapezoidal shape in a direction from the first base substrate 2 to the second base substrate 4. The first plane is perpendicular to both the light emitting surface 22 and the light incident surface 21, that is, the first plane is an XZ plane.

For example, the first base substrate 2, the second base substrate 4, the first substrate 111, and the second substrate 121 may all be glass substrates. That is, their refractive indexes are all about 1.5.

For example, the transparent display device may further include an optical adhesive layer 7, which is disposed between the second base substrate 4 and the first substrate 111, and a refractive index of a material of the optical adhesive layer 7 is substantially equal to the refractive index of the material of the second base substrate 4. That is, the refractive index of the optical adhesive layer 7 matches the refractive index of the glass substrate, which may achieve a better transparent display effect and better brightness uniformity.

Similarly, referring to FIGS. 3 and 5 in combination, a distribution density of the orthographic projections of the plurality of protrusions 50 on the light emitting surface 22 gradually increases in a direction away from the light source 3. That is to say, the distribution of the orthographic projections of the plurality of protrusions 50 on the light emitting surface 22 gradually changes from sparse distribution to dense distribution in the direction away from the light source 3. On the side close to the light source 3, the plurality of protrusions 50 are distributed sparsely; and on the side away from the light source 3, the plurality of protrusions 50 are distributed densely.

For example, in the embodiments of the present disclosure, the orthographic projections of the plurality of protrusions 50 on the light emitting surface 22 are distributed in an array in a first direction X and in a second direction Y, so as to form a plurality of distribution areas. The plurality of distribution areas include at least a first distribution area DR1, a second distribution area DR2, and a third distribution area DR3. The first distribution area DR1, the second distribution area DR2, and the third distribution area DR3 are disposed in a direction away from the light source 3 in sequence.

A distance between two adjacent protrusions 50 in the first distribution area DR1 in the first direction X is greater than a distance between two adjacent protrusions 50 in the second distribution area DR2 in the first direction X, and the distance between two adjacent protrusions 50 in the second distribution area DR2 in the first direction X is greater than a distance between two adjacent protrusions 50 in the third distribution area DR3 in the first direction X.

A distance between two adjacent protrusions 50 in the first distribution area DR1 in the second direction Y is greater than a distance between two adjacent protrusions 50 in the second distribution area DR2 in the second direction Y, the distance between two adjacent protrusions 50 in the second distribution area DR2 in the second direction Y is greater than a distance between two adjacent protrusions in the third distribution area DR3 in the second direction Y.

For example, an orthographic projection of the first base substrate 2 in the XY plane may be rectangular, a size of the first base substrate 2 in the first direction X may be about 100 mm, and a size of the first base substrate 2 in the second direction Y may be about 180 mm. The first base substrate 2 may be divided into 5 distribution areas, that is, the plurality of distribution areas may include a first distribution area DR1, a fourth distribution area DR4, a second distribution area DR2, a fifth distribution area DR5, and a third distribution area DR3. The first distribution area DR1, the fourth distribution area DR4, the second distribution area DR2, the fifth distribution area DR5, and the third distribution area DR3 are arranged in a direction away from the light source 3 in sequence.

In the first distribution area DR1, the orthographic projections of the plurality of protrusions 50 on the light emitting surface 22 may be distributed as follows: 19 in the first direction X and 179 in the second direction Y. Correspondingly, distribution pitches of the orthographic projections of the plurality of protrusions 50 on the light emitting surface 22 are as follows: a pitch between two adjacent protrusions 50 in the first direction X is about 1 mm, and a pitch between two adjacent protrusions 50 in the second direction Y is about 1 mm.

In the fourth distribution area DR4, the orthographic projections of the plurality of protrusions 50 on the light emitting surface 22 may be distributed as follows: 89 in the first direction X, and 807 in the second direction Y. Correspondingly, distribution pitches of the orthographic projections of the plurality of protrusions 50 on the light emitting surface 22 are as follows: a pitch between two adjacent protrusions 50 in the first direction X is about 0.2247 mm, and a pitch between two adjacent protrusions 50 in the second direction Y is about 0.2228 mm.

In the second distribution area DR2, the orthographic projections of the plurality of protrusions 50 on the light emitting surface 22 may be distributed as follows: 632 in the first direction X, and 5696 in the second direction Y. Correspondingly, the distribution pitches of the orthographic projections of the plurality of protrusions 50 on the light emitting surface 22 are as follows: a pitch between two adjacent protrusions 50 in the first direction X is about 0.0316 mm, and a pitch between two adjacent protrusions 50 in the second direction Y is about 0.0316 mm.

In the fifth distribution area DR5, the orthographic projections of the plurality of protrusions 50 on the light emitting surface 22 may be distributed as follows: 1092 in the first direction X, and 9890 in the second direction Y. Correspondingly, the distribution pitches of the orthographic projections of the plurality of protrusions 50 on the light emitting surface 22 are as follows: a pitch between two adjacent protrusions 50 in the first direction X is about 0.0183 mm, and a pitch between two adjacent protrusions 50 in the second direction Y is about 0.0182 mm.

In the third distribution area DR3, the orthographic projections of the plurality of protrusions 50 on the light emitting surface 22 may be distributed as follows: 1481 in the first direction X, and 13333 in the second direction Y. Correspondingly, the distribution pitches of the orthographic projections of the plurality of protrusions 50 on the light emitting surface 22 are as follows: a pitch between two adjacent protrusions 50 in the first direction X is about 0.0135 mm, and a pitch between two adjacent protrusions 50 in the second direction Y is about 0.0135 mm.

For example, in the same distribution area, the pitch between two adjacent protrusions 50 in the first direction X is substantially equal to the pitch between two adjacent protrusions 50 in the second direction Y. In this way, it is beneficial to achieving better brightness uniformity.

In the embodiments of the present disclosure, each protrusion 50 includes a bottom surface 52 close to the first base substrate 2. For example, a size of the orthographic projection of the bottom surface 52 of each protrusion 50 on the light emitting surface 22 in the first direction X is between 8 and 12 microns, and/or a size of the orthographic projection of the bottom surface 52 of each protrusion 50 on the light emitting surface 22 in the second direction Y is between 8 and 12 microns. For another example, a size of each protrusion 50 in a direction perpendicular to the light emitting surface 22 is greater than 0.5 microns.

For example, a thickness of the first base substrate 2 is 0.5 micrometers or more.

Through such size matching, a light extraction effect of the transparent display device may be improved, which is beneficial to achieving better brightness uniformity.

Figure 8A:
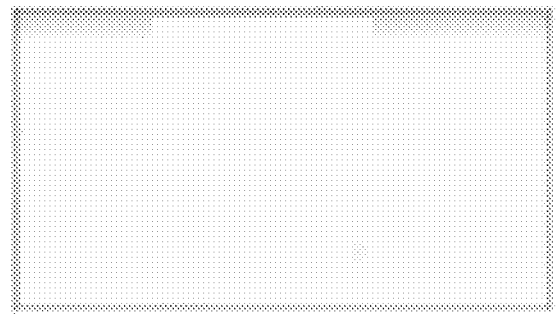
FIG. 8A is a simulation illumination diagram of a transparent display device according to some embodiments of the present disclosure.
Figure 8A:
Figure 8B:
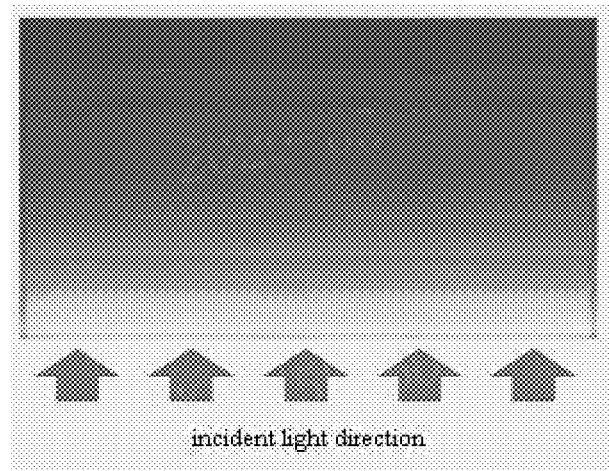
FIG. 8B is a simulation illumination diagram of a transparent display device without a dot-array structure.

FIG. 8A is a simulation illumination diagram of a transparent display device according to some exemplary embodiments of the present disclosure. FIG. 8B is a simulation illumination diagram of a transparent display device without a dot-array structure. Referring to FIG. 8A and FIG. 8B, the model shown in FIG. 2 or FIG. 5 is established in an optical simulation software. When the refractive index of the light guide dot material is 1.91, it may be obtained by light tracing, and then calculated according to the uniform nine-point method that the brightness uniformity of the transparent display device after adding the dot-array structure 5 is higher than 80% (as shown in FIG. 8A), which is 8 times higher than the brightness uniformity of the transparent display device without the dot-array structure (as shown in FIG. 8B). It can be seen that, in the transparent display device provided by the embodiments of the present disclosure, by adding the dot-array structure 5, the light may uniformly enter the liquid crystal cell through the dot-array structure, thereby achieving a high uniformity display.

Figure 6:
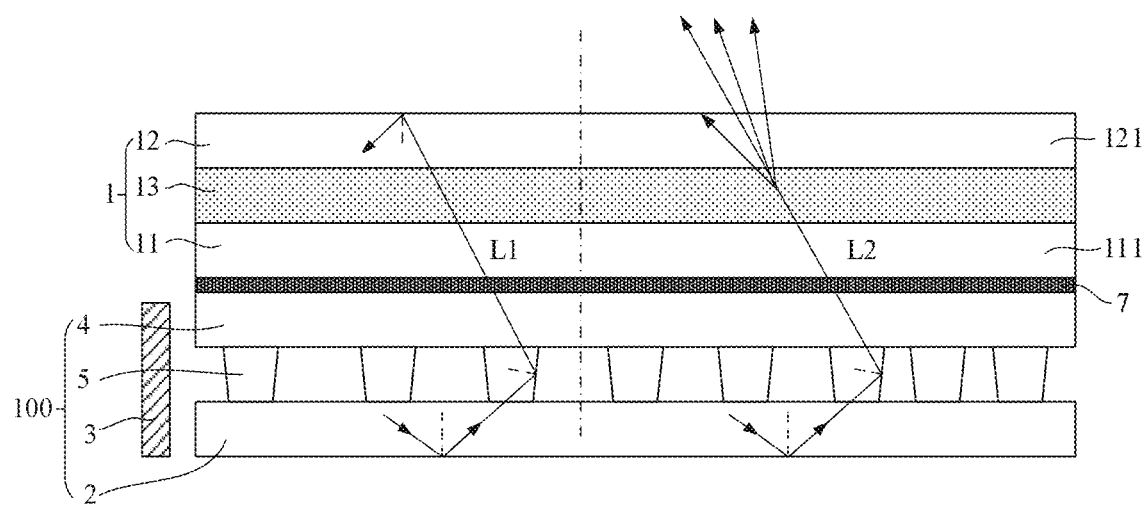
FIG. 6 and FIG. 7 are schematic cross-sectional views of a transparent display device according to some other embodiments of the present disclosure, respectively.
Figure 7:
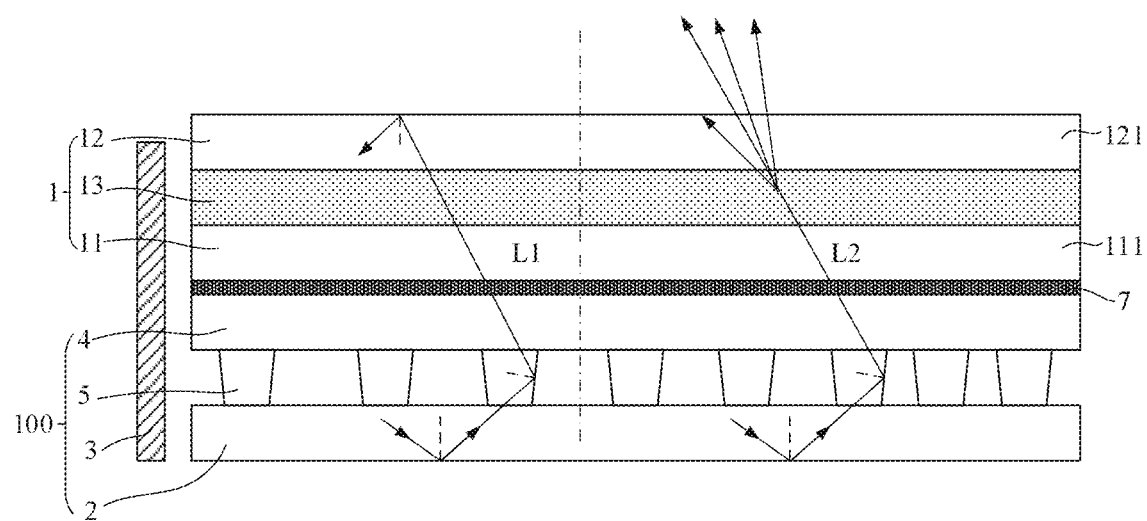

FIGS. 6 and 7 are schematic cross-sectional views of a transparent display device according to some other exemplary embodiments of the present disclosure, respectively. The following will mainly describe differences between the embodiments of FIG. 6, FIG. 7 and FIG. 2 or FIG. 5. For the similarities between them, reference may be made to the above description, which will not be repeated here.

In the above embodiments, the size of the light source 3 in the direction perpendicular to the light emitting surface 22 is substantially equal to the size of the first base substrate 2 in the direction perpendicular to the light emitting surface 22. For example, the thickness of the first base substrate 2 is about 0.5 mm, and the thickness of the light source 3 may also be about 0.5 mm.

In the embodiments shown in FIGS. 6 and 7, the size of the light source 3 in the direction perpendicular to the light emitting surface 22 is greater than the size of the first base substrate 2 in the direction perpendicular to the light emitting surface 22. In this case, the light source 3 may include multiple rows of LED chips.

For example, the thickness of the first base substrate 2 is about 0.5 mm. In the embodiment shown in FIG. 6, the thickness of the light source 3 may be about 1 mm. In the embodiment shown in FIG. 7, the thickness of the light source 3 may be about 2 mm.

According to the optical simulation results, in the embodiments shown in FIG. 6 and FIG. 7, since more light enters the light guide plate, a light extraction efficiency is increased by about three times.

In some exemplary embodiments, the light source 3 may be a field sequential light source, that is, the light source 3 may sequentially emit light of different colors. For example, the light source 3 may emit red light, green light and blue light at a frequency of 180 hz, that is, the light source 3 may be a field sequential light source with three colors of R, G, and B cyclical illumination. When the light source 3 emits red light, the pixels to display red may be in the scattered state under electric drive, and other pixels are in the transparent state; when the light source 3 emits green light, the pixels to display green may be in the scattered state under electric drive, and other pixels are in the transparent state; when the light source 3 emits blue light, the pixels to display blue may be in the scattered state under electric drive, and other pixels are in the transparent state. As a result, the transparent display device may perform light emitting display at a frame rate of 60 Hz.

Figure 9:
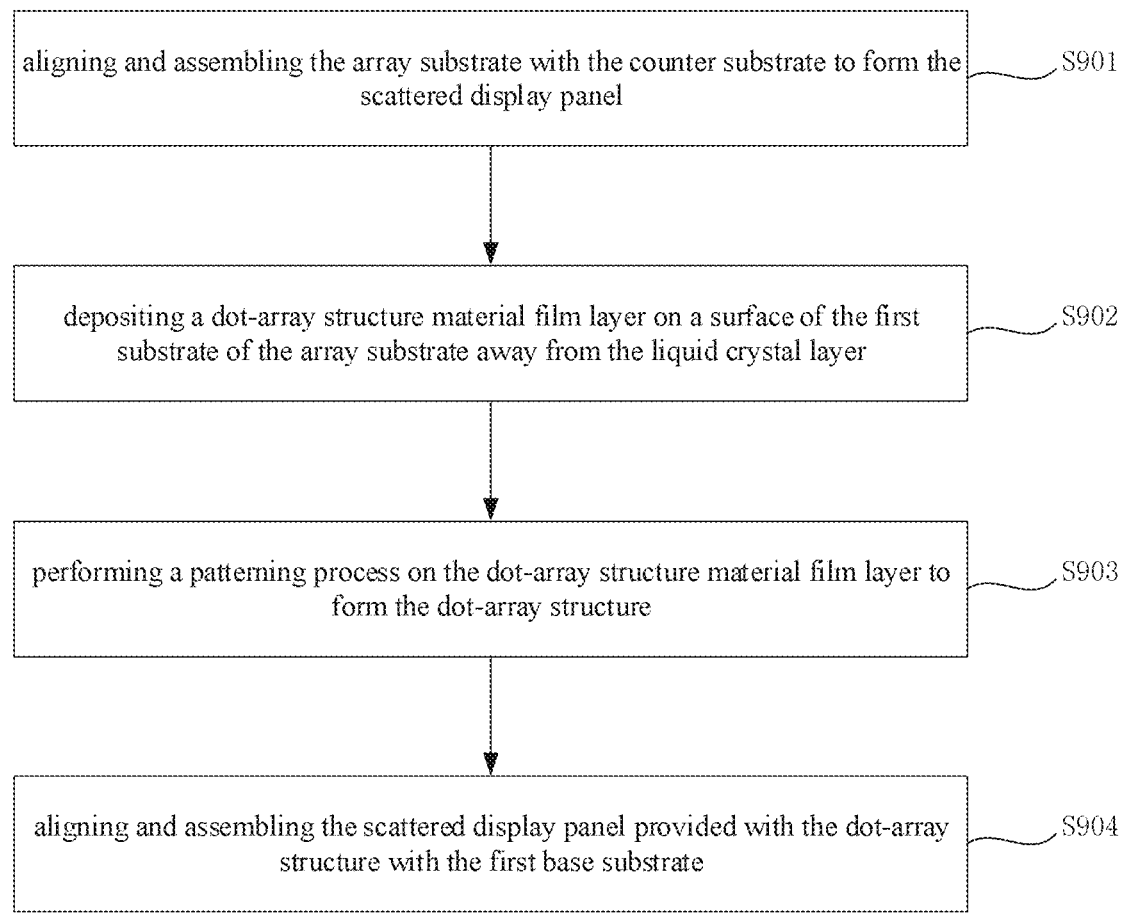
FIG. 9 is a flow chart of a method of manufacturing a transparent display device according to some exemplary embodiments of the present disclosure.

FIG. 9 is a flowchart of a method of manufacturing a transparent display device according to some exemplary embodiments of the present disclosure. FIGS. 10A to 10G are schematic diagrams of structures formed after some steps of the manufacturing method shown in FIG. 9 are performed. The method of manufacturing the transparent display device may include the following steps.

Figure 10A:
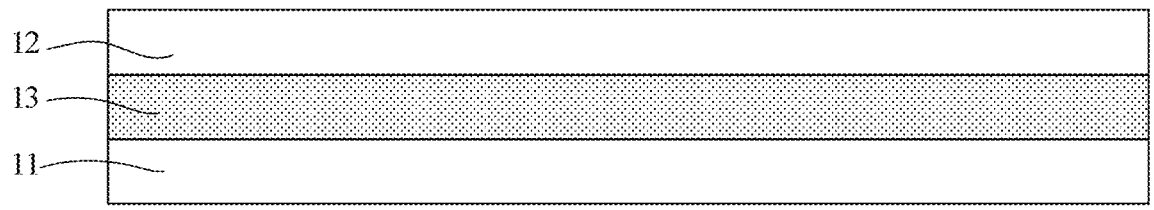
FIGS. 10A-10G are schematic diagrams of a structure formed after some steps of the method shown in FIG. 9 are performed, respectively.

In step S901, the array substrate 11 and the counter substrate 12 are aligned and assembled to form the scattered display panel 1. As shown in FIG. 10A, the scattered display panel 1 includes an array substrate 11, a counter substrate 12, and a liquid crystal layer 13 between the array substrate and the counter substrate.

Figure 10B:
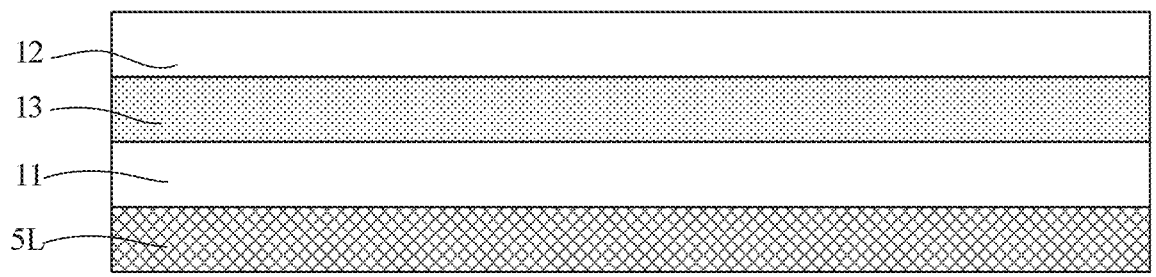

In step S902, a dot-array structure material film layer 5L is deposited on a surface of the first substrate 111 of the array substrate 11 away from the liquid crystal layer 13, as shown in FIG. 10B. For example, a process such as PECVD may be used to deposit the dot-array structure material film layer 5L.

Figure 10C:
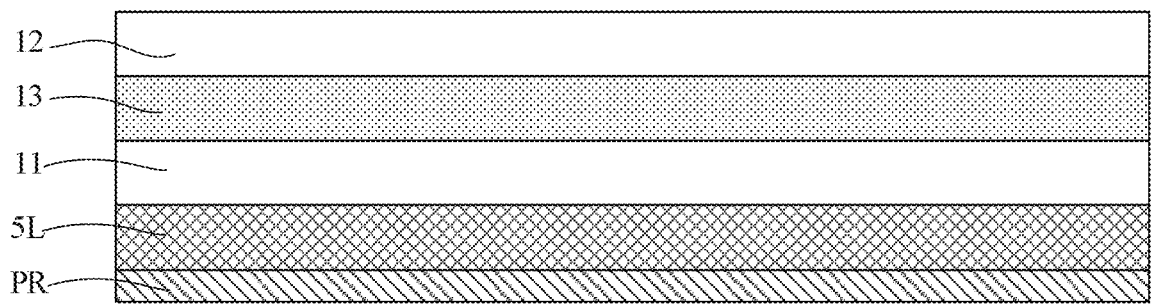
Figure 10D:
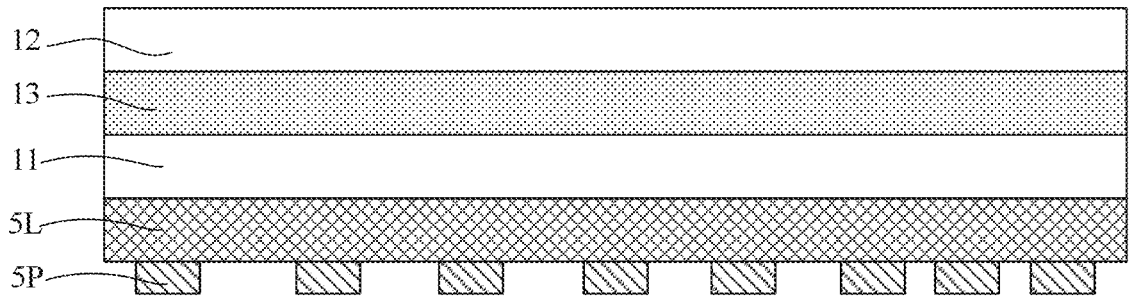
Figure 10E:
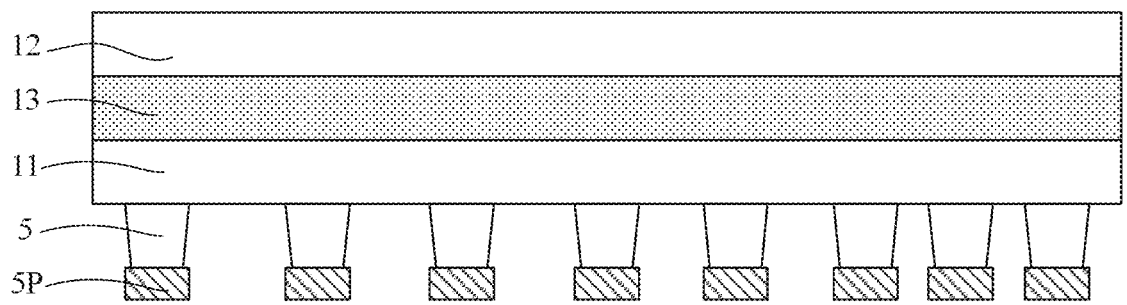
Figure 10F:
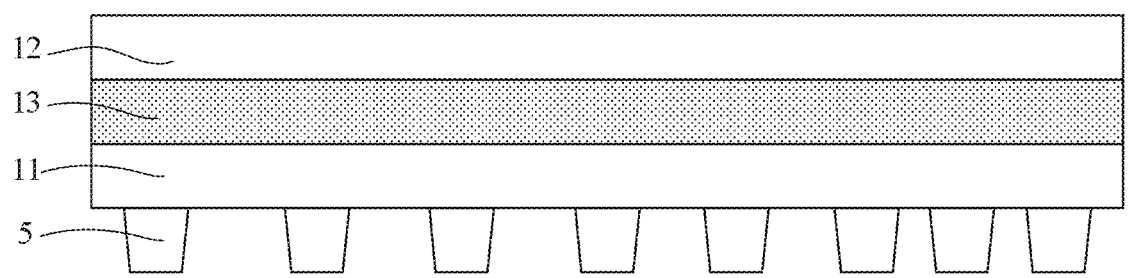

In step S903, a patterning process is performed on the dot-array structure material film layer 5L to form the dot-array structure. For example, as shown in FIG. 10C, a layer of photoresist PR may be coated on a surface of the dot-array structure material film layer 5L away from the scattered display panel 1. As shown in FIG. 10D, the photoresist PR is exposed using a mask, and the exposed photoresist PR is developed to form a photoresist pattern 5P. As shown in FIG. 10E, a portion of the dot-array structure material film layer 5L that is not covered by the photoresist pattern 5P is etched by ICP etching process to form the dot-array structure 5. Then, by using the ICP etching process, the protrusions 50 with the above-mentioned inverted trapezoidal design may be formed. Then, as shown in FIG. 10F, the remaining photoresist is removed (for example, stripped).

Figure 10G:
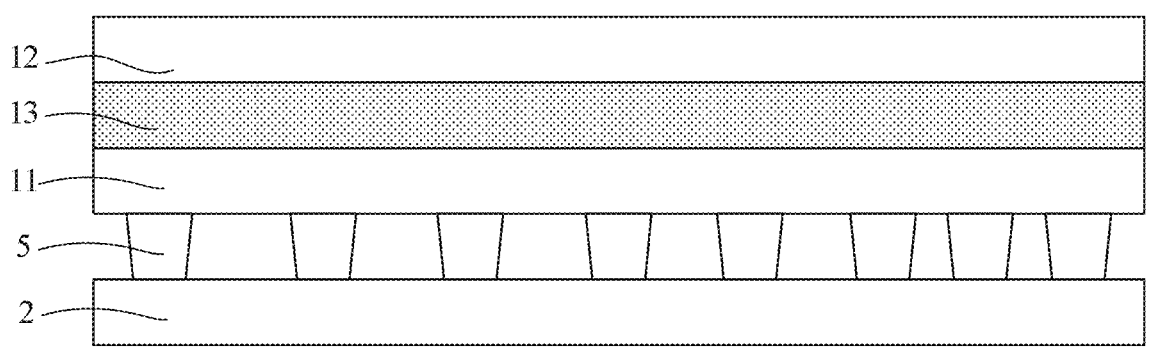

In step S904, the scattered display panel 1 provided with the dot-array structure 5 is aligned and assembled with the first base substrate 2, as shown in FIG. 10G. The first base substrate 2 has a light emitting surface 22 facing the scattered display panel 1 and a light incident surface 21 perpendicularly connected to the light emitting surface 22, and the dot-array structure 5 is located between the first base substrate 2 and the first substrate 111 of the array substrate 11.

Figure 11:
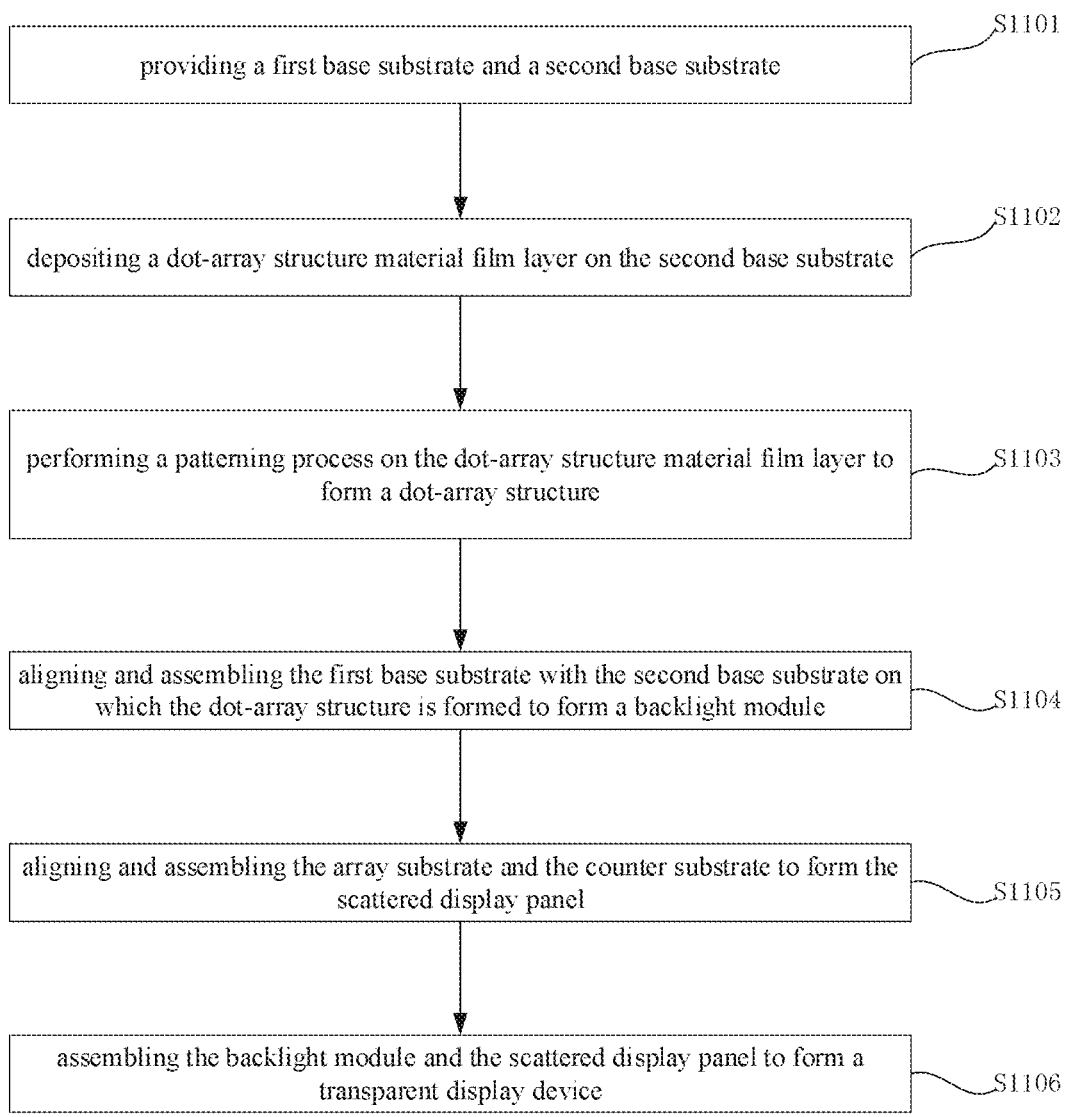
FIG. 11 is a flow chart of a method of manufacturing a transparent display device according to some exemplary embodiments of the present disclosure.

FIG. 11 is a flowchart of a method of manufacturing a transparent display device according to some exemplary embodiments of the present disclosure. The method of manufacturing the transparent display device may include the following steps.

In step S1101, a first base substrate 2 and a second base substrate 4 are provided. For example, the first base substrate 2 and the second base substrate 4 may both be glass substrates.

In step S1102, a dot-array structure material film layer is deposited on the second base substrate 4.

In step S1103, a patterning process is performed on the dot-array structure material film layer to form a dot-array structure 5.

In step S1104, the first base substrate 1 is aligned and assembled with the second base substrate 4 on which the dot-array structure 5 has been formed to form a backlight module 100. Wherein, in the backlight module 100, the dot-array structure 5 is located between the first base substrate 2 and the second base substrate 4.

In step S1105, the array substrate 11 and the counter substrate 12 are aligned and assembled to form the scattered display panel 1.

In step S1106, the backlight module 100 and the scattered display panel 1 are assembled to form a transparent display device, as shown in FIG. 5.

Although some embodiments of the general inventive concept of the present disclosure have been illustrated and described, those of ordinary skill in the art will understand that these embodiments may be altered without departing from the principle and spirit of the general inventive concept of the present disclosure. The scope of the present disclosure is defined by the claims and their equivalents.

What is claimed is:

1. A transparent display device, wherein the transparent display device comprises:
   a scattered display panel, wherein the scattered display panel comprises a display side;
   a first base substrate, wherein the first base substrate is disposed on a side of the scattered display panel facing away from the display side;
   a light source, wherein the light source is disposed on a side of the first base substrate; and
   a dot-array structure, wherein the dot-array structure is disposed between the scattered display panel and the first base substrate,
   wherein the first base substrate comprises a light incident surface and a light emitting surface, the light incident surface is disposed opposite to the light source, and the light emitting surface is located on a side of the first base substrate close to the dot-array structure;
   wherein the dot-array structure comprises a plurality of protrusions, and orthographic projections of the plurality of protrusions on the light emitting surface are distributed in an array;
   wherein an orthographic projection of each protrusion on a first plane is in an inverted trapezoidal shape in a direction from the first base substrate to the scattered display panel, wherein the first plane is perpendicular to both the light emitting surface and the light incident surface; and
   wherein each protrusion is provided with a first side wall away from the light source, an inclination angle is located between the first side wall and the light emitting surface, and the inclination angle is between 60° and 90°.

2. The transparent display device according to claim 1, wherein a distribution density of the orthographic projections of the plurality of protrusions on the light emitting surface gradually increases in a direction away from the light source.

3. The transparent display device according to claim 1, wherein the transparent display device further comprises a plurality of low-refractive-index portions, the plurality of low-refractive-index portions are located in gaps formed between any two adjacent protrusions, respectively, and a refractive index of a material of the low-refractive-index portion is smaller than a refractive index of a material of the protrusions.

4. The transparent display device according to claim 2, wherein the transparent display device further comprises a plurality of low-refractive-index portions, the plurality of low-refractive-index portions are located in gaps formed between any two adjacent protrusions, respectively, and a refractive index of a material of the low-refractive-index portion is smaller than a refractive index of a material of the protrusions.

5. The transparent display device according to claim 3, wherein the scattered display panel comprises:
an array substrate comprising a first substrate;
a counter substrate aligned with the array substrate, the counter substrate comprising a second substrate; and
a liquid crystal layer between the array substrate and the counter substrate,
wherein the dot-array structure is located between the first substrate and the first base substrate, a surface of each protrusion facing the display side is in contact with the first substrate, and a surface of each protrusion facing away from the display side is in contact with the first base substrate.

6. The transparent display device according to claim 5, wherein the first base substrate, the first substrate and the second substrate are all glass substrates.

7. The transparent display device according to claim 3, wherein the scattered display panel comprises:
an array substrate comprising a first substrate;
a counter substrate aligned with the array substrate, the counter substrate comprising a second substrate; and
a liquid crystal layer between the array substrate and the counter substrate,
wherein the transparent display device further comprises a second base substrate between the first base substrate and the first substrate; and
wherein the dot-array structure is located between the first base substrate and the second base substrate, a surface of each protrusion facing the display side is in contact with the second base substrate, and a surface of each protrusion facing away from the display side is in contact with the first base substrate.

8. The transparent display device according to claim 7, wherein the first base substrate, the second base substrate, the first substrate and the second substrate are all glass substrates.

9. The transparent display device according to claim 6, wherein the refractive index of the material of the protrusions is greater than a refractive index of glass.

10. The transparent display device according to claim 8, wherein the refractive index of the material of the protrusions is greater than a refractive index of glass.

11. The transparent display device according to claim 8, wherein the transparent display device further comprises an optical adhesive layer between the second base substrate and the first substrate, and a refractive index of a material of the optical adhesive layer is substantially equal to a refractive index of a material of the second base substrate.

12. The transparent display device according to claim 9, wherein the refractive index of the material of the protrusions is between 1.7 and 4.

13. The transparent display device according to claim 2, wherein the orthographic projections of the plurality of protrusions on the light emitting surface are distributed in an array in a first direction and in a second direction, so as to form a plurality of distribution areas, the plurality of distribution areas at least comprise a first distribution area, a second distribution area and a third distribution area, and the first distribution area, the second distribution area and the third distribution area are arranged in the direction away from the light source in sequence; and
wherein a pitch between two adjacent protrusions in the first distribution area in the first direction is greater than a pitch between two adjacent protrusions in the second distribution area in the first direction, and the pitch between two adjacent protrusions in the second distribution area in the first direction is greater than a pitch between two adjacent protrusions in the third distribution area in the first direction; and/or
wherein a pitch between two adjacent protrusions in the first distribution area in the second direction is greater than a pitch between two adjacent protrusions in the second distribution area in the second direction, and the pitch between two adjacent protrusions in the second distribution area in the second direction is greater than a pitch between two adjacent protrusions in the third distribution area in the second direction.

14. The transparent display device according to claim 3, wherein the low-refractive-index portion comprises air.

15. The transparent display device according to claim 6, wherein:
each protrusion comprises a first surface close to the first base substrate, and a size of an orthographic projection of the first surface on the light emitting surface in the first direction is between 8 and 12 microns; and/or
a size of the orthographic projection of the first surface on the light emitting surface in the second direction is between 8 and 12 microns; and/or
a size of each protrusion in a direction perpendicular to the light emitting surface is at least 0.5 micron.

16. The transparent display device according to claim 1, wherein a size of the light source in a direction perpendicular to the light emitting surface is greater than a size of the first base substrate in the direction perpendicular to the light emitting surface.

17. A backlight module, wherein the backlight module comprises:
a first base substrate;
a second base substrate opposite to the first base substrate;
a light source on a side of the first base substrate; and
a dot-array structure between the first base substrate and the second base substrate,
wherein the first base substrate comprises a light incident surface and a light emitting surface, the light incident surface is disposed opposite to the light source, and the light emitting surface is located on a side of the first base substrate close to the dot-array structure;
wherein the dot-array structure comprises a plurality of protrusions, and orthographic projections of the plurality of protrusions on the light emitting surface are distributed in an array;
wherein a surface of each protrusion facing the first base substrate is in contact with the first base substrate, and a surface of each protrusion facing the second base substrate is in contact with the second base substrate;

wherein an orthographic projection of each protrusion on a first plane is in an inverted trapezoidal shape in a direction from the first base substrate to the second base substrate, and the first plane is perpendicular to both the light emitting surface and the light incident surface; and wherein each protrusion is provided with a first side wall away from the light source, an inclination angle is located between the first side wall and the light emitting surface, and the inclination angle is between 60° and 90°.

18. A method of manufacturing a transparent display device, wherein the method comprises:

aligning and assembling an array substrate with a counter substrate to form a scattered display panel, wherein the array substrate comprises a first substrate, and the scattered display panel comprises the array substrate, the counter substrate and a liquid crystal layer between the array substrate and the counter substrate;

depositing a dot-array structure material film layer on a surface of the first substrate away from the liquid crystal layer;

performing a patterning process on the dot-array structure material film layer to form a dot-array structure; and aligning and assembling a first base substrate with the scattered display panel provided with the dot-array structure, wherein the first base substrate comprises a light emitting surface facing the scattered display panel and a light incident surface perpendicular to the light emitting surface, wherein the dot-array structure comprises a plurality of protrusions, and orthographic projections of the plurality of protrusions on the light emitting surface are distributed in an array;

wherein an orthographic projection of each protrusion on a first plane is in an inverted trapezoidal shape in a direction from the first base substrate to the scattered display panel, and the first plane is perpendicular to both the light emitting surface and the light incident surface; and wherein each protrusion is provided with a first side wall away from the light source, an inclination angle is located between the first side wall and the light emitting surface, and the inclination angle is between 60° and 90°.

\* \* \* \* \*